Aug. 4, 1942.                L. F. MEUNIER                2,292,146
                       HYDRAULIC POWER TRANSMISSION
                       Filed Dec. 26, 1940            4 Sheets-Sheet 1

INVENTOR
LEON F. MEUNIER
BY
Raymond G. Mullee
ATTORNEY

Aug. 4, 1942.　　　　L. F. MEUNIER　　　　2,292,146
HYDRAULIC POWER TRANSMISSION
Filed Dec. 26, 1940　　　　4 Sheets-Sheet 3

INVENTOR
LEON F. MEUNIER.
BY
Raymond G. Mullee
ATTORNEY

Aug. 4, 1942.     L. F. MEUNIER     2,292,146
HYDRAULIC POWER TRANSMISSION
Filed Dec. 26, 1940     4 Sheets-Sheet 4
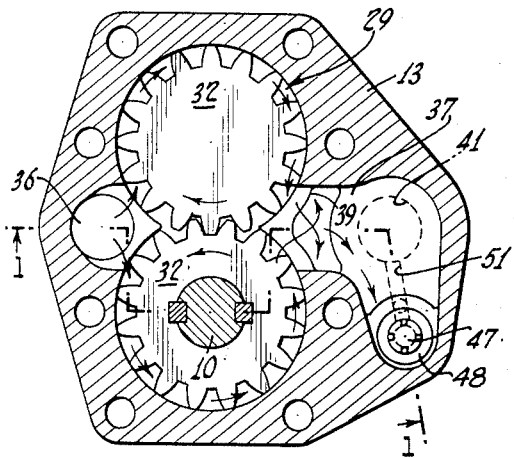
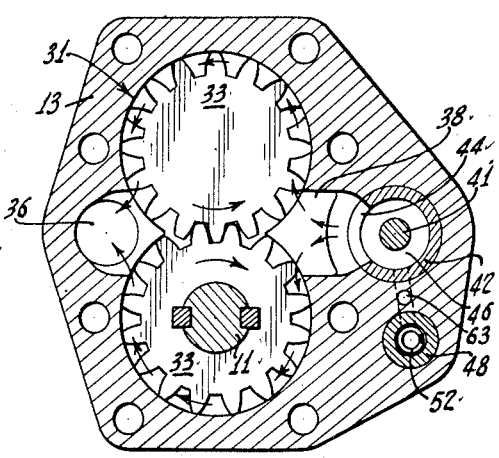
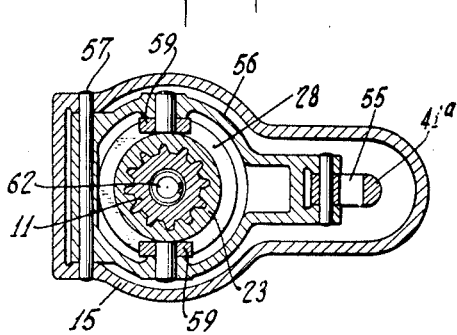
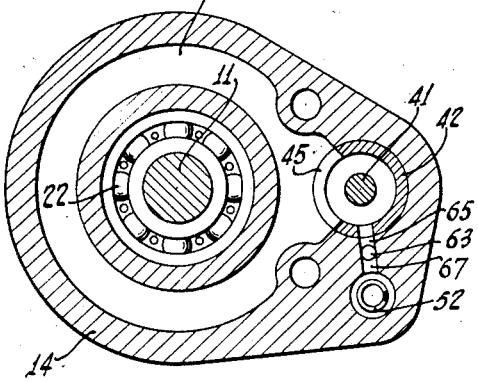
INVENTOR
LEON F. MEUNIER.
BY
Raymond G. Muller
ATTORNEY

UNITED STATES PATENT OFFICE 2,292,146

HYDRAULIC POWER TRANSMISSION

Leon F. Meunier, Cleveland, Ohio, assignor to Chicago Pneumatic Tool Company, New York, N. Y., a corporation of New Jersey Application December 26, 1940, Serial No. 371,671

17 Claims. (Cl. 81—54)

This invention relates to hydraulic means for transmitting a rotational impulse of predetermined intensity, and relates more particularly to transmission means of this kind capable of embodiment in rotary tools for use in nut running, screw driving, threading, tapping and like operations.

While broadly applicable to any tool of this general class the invention has especial value in power driven nut running tools, since it provides a means for setting each of a series of nuts to the same predetermined degree of tightness.

One object of the invention is to embody in a nut running or like tool an integrally formed hydraulic transmission including a fluid reservoir, a pump for circulating fluid and a rotary motor operated by the circulation of fluid.

Another object of the invention is to limit the pressure applied through the hydraulic circuit to the motor to a rotational impulse of an intensity less than the maximum intensity which the pump is capable of developing.

Another object is to enable the intensity of the rotational impulse delivered to the motor to be varied at the will of the operator.

A further object is to prevent the application of repeated impulses to the motor during a single nut running operation.

In carrying out these objects relating to the control of hydraulic pressure, there has been provided a control element settable to first and second control positions to render the transmission means effective and ineffective, an adjustable pressure responsive pilot valve within the hydraulic circuit for controlling movement of the control element from first to second position, and means arranged to be operated by pressure of the tool against the work for setting the control element from second to first position.

Other objects and structural details of the invention will be apparent from the following description when read in conjunction with the accompanying drawings, wherein.

Figure 1:
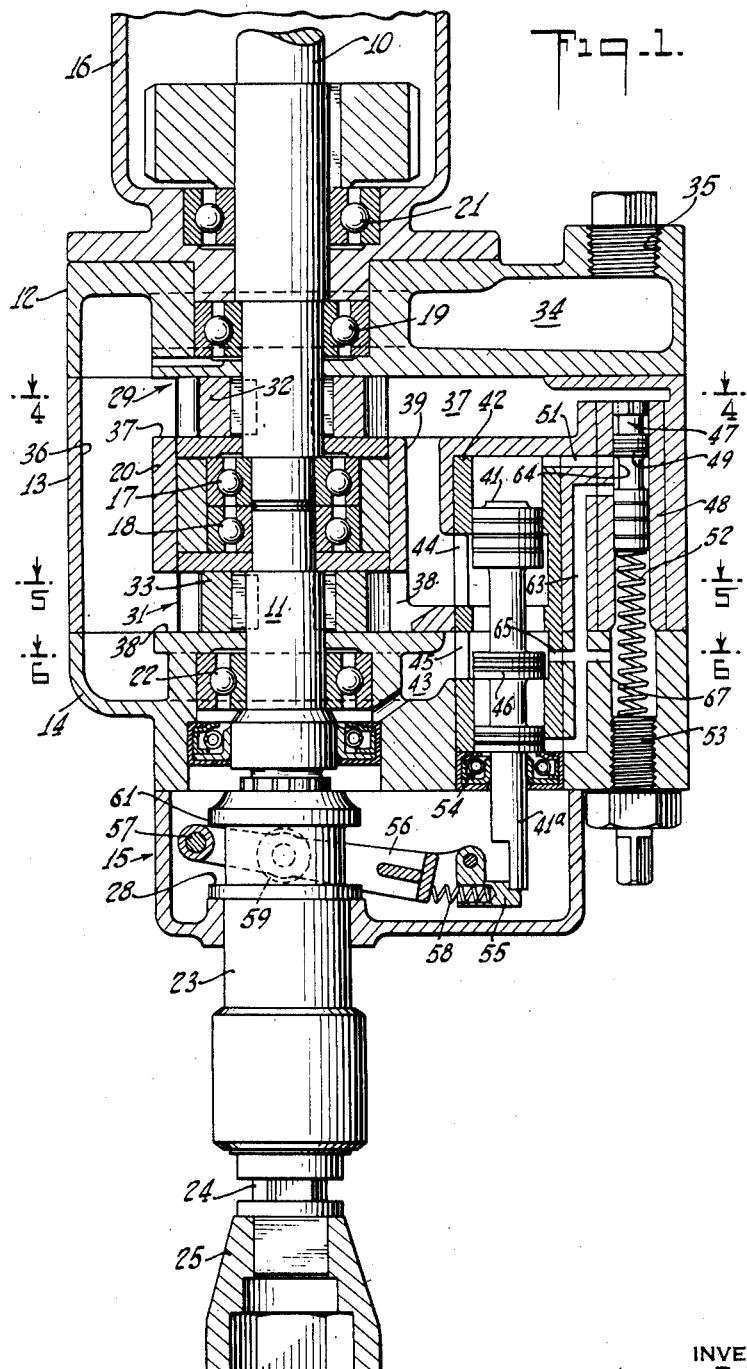
Fig. 1 is a view in longitudinal section of the front end of a nut running tool embodying the mechanism of the present invention, this view being taken along the irregular line 1—1 of Fig. 4.
Figure 2:
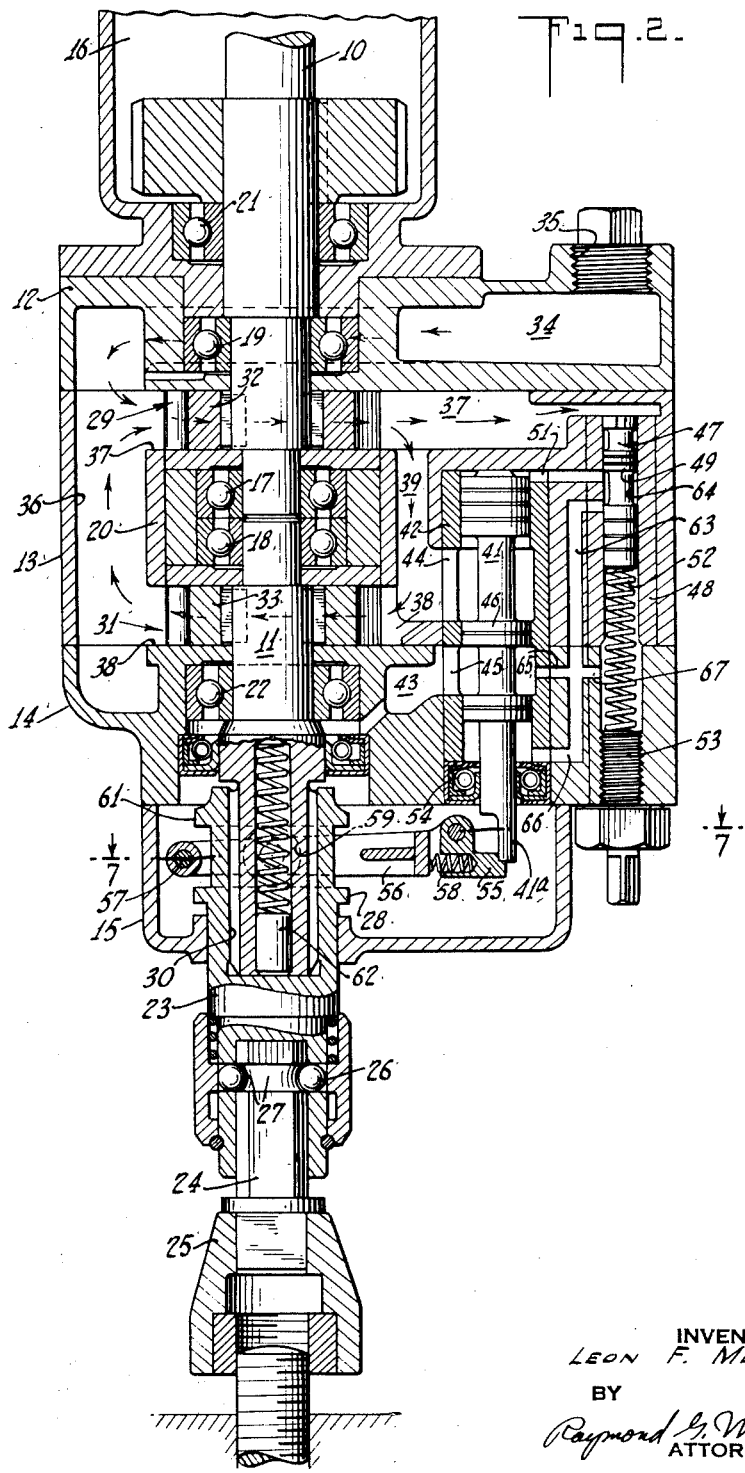
Fig. 2 is a view similar to Fig. 1, showing the tool in the act of running up a nut.

Figs. 4, 5 and 6 are cross sectional views of the tool, taken substantially along the respective lines 4—4, 5—5 and 6—6 of Fig. 1; and Fig. 7 is a view in cross section, taken substantially along the line 7—7 of Fig. 2.

The invention is thus concerned primarily with a novel transmission means intermediate rotary driving and driven elements. For convenience of illustration, therefore, the drawings are limited to a showing of driving and driven shafts, in association with the present transmission, disclosed as embodied in a nut running tool of otherwise conventional construction. Such a modification of the usual tool serves to produce a front end construction of the kind shown in Figs. 1, 2 and 3 adapted for use in either portable handheld tools or in stationary pedestal-mounted machines.

Figure 3:
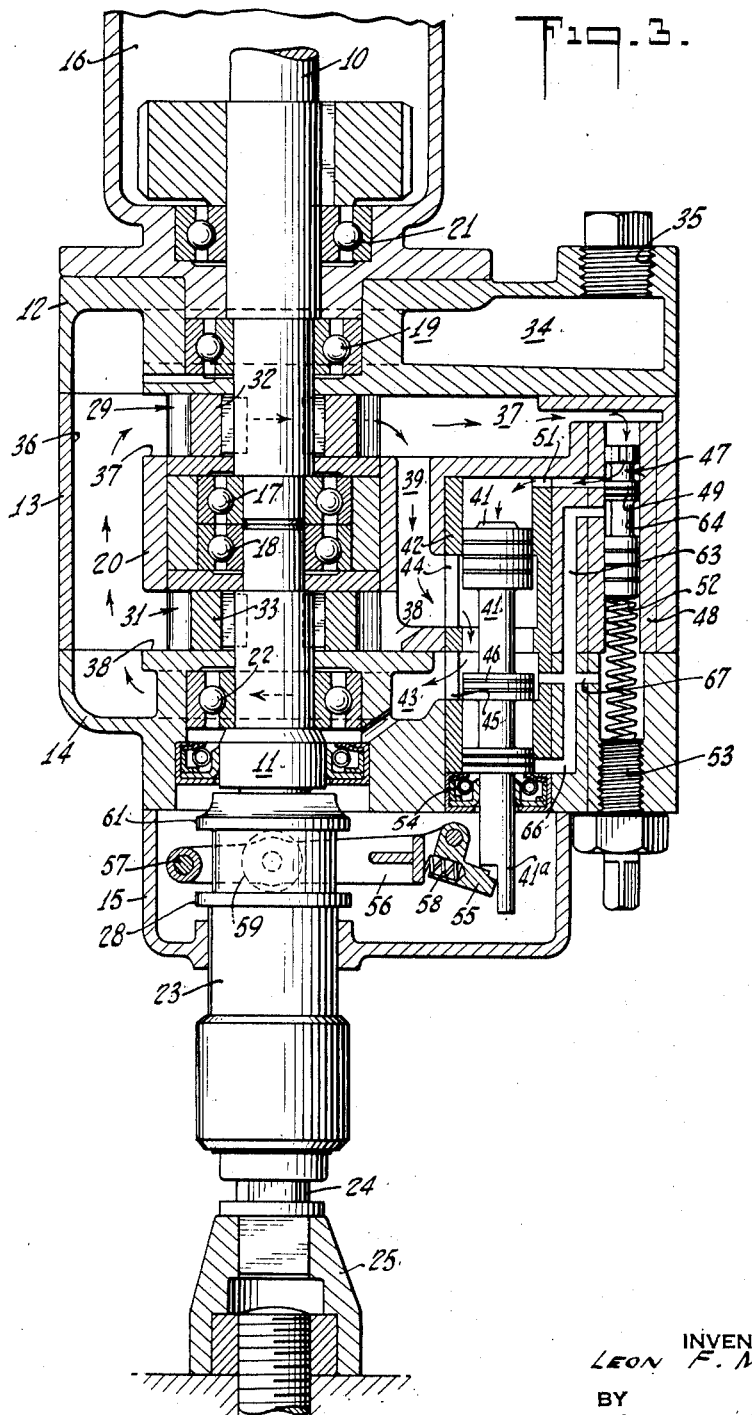
Fig. 3 is a view similar to Fig. 2, showing the nut in seated position and the hydraulic transmission automatically disabled.

Referring to Figs. 1, 2 and 3, the driving shaft is indicated at 10 and the driven shaft at 11. The shafts are axially aligned and are supported in a frame assembly comprised of a plurality of interconnected pieces 12, 13, 14 and 15 secured to the front of the main tool body 16. The shaft 10 extends rearwardly through the main frame 16 and may be geared or otherwise connected to a prime mover such as an electric or compressed air motor. The adjacent ends of the shafts 10 and 11 terminate within a casing 20 and are mounted in respective ball bearings 17 and 18. Additional anti-friction bearings 19 and 21 are provided for the shaft 10 rearwardly of the casing 20 while the front end of the shaft 11 is mounted in another ball bearing 22 in advance of the casing 20. As shown in Fig. 2, the outer or front end of the driven shaft 11 projects into the recessed inner end 30 of a spindle 23 and has a splined connection therewith. Thus the two elements are caused to rotate as a unit but are permitted relative longitudinal movement. The outer end of the spindle 23 is formed with a recess shaped in correspondence with the polygonal shank of a working implement 24 adapted to be inserted therein. The implement 24 has a nut engaging socket 25 secured thereto and is held within the spindle 23 by a retainer assembly or chuck including a set of locking balls 26 supported within the spindle 23 in cooperative relation with an annular groove 27 in the shank of the working implement. Thus, when the rotary motion of the drive shaft 10 is transmitted to the driven shaft 11 the spindle 23 and working implement 24 are carried with the driven shaft and the work of running up a nut performed in the manner indicated in Figs. 2 and 3. The spindle 23 is rotatably mounted in the front frame piece 15 and is limited in its forward longitudinal movement by the engagement of a flange 28 thereof with an internal boss on the frame. Rearward movement of the spindle is limited by engagement of the front end of shaft 11 with the bottom of the recess 30.

The hydraulic transmission of the invention is comprised essentially of a gear assembly 29 (Figs. 1 and 4), driven by the shaft 10, for circulating fluid, and a gear assembly 31 (Figs. 1 and 5) operatively connected to the shaft 11 and driven by such circulation of fluid. As will be seen from a comparison of Figs. 4 and 5, the assemblies 29 and 31 are similar structures of a well known kind in which a pair of intermeshed gear wheels is disposed in a confined hydraulic circuit and functions selectively as a pump, a motor or a brake. In the assembly 29 the lower one of the pair of gear wheels 32 is keyed to the shaft 10 while the upper wheel is loosely mounted in the frame in a manner not fully shown herein. In the assembly 31 the pair of gear wheels 33 is similarly mounted, but in this case the lower wheel is keyed to the shaft 11. The assembly 29 is thus positively driven by the shaft 10 and so adapted to function as a pump, while the assembly 31 being connected to the driven shaft 11 is adapted to function as a motor.

The hydraulic circuit includes a reservoir 34 (Figs. 1-3), formed in the frame casing 12, into which oil or other hydraulic fluid may be introduced through a filler port 35. The reservoir communicates with a vertical passageway 36 in frame piece 13 (see also Figs. 4 and 5) which opens into recesses or chambers 37 and 38 located respectively above and below the bearing casing 20. A passage 39 connects the chambers 37 and 38 to complete a circuit in which the oil may pass from the reservoir 34 to the chamber 37, through passage 39 to chamber 38 and through passageway 36 back to the reservoir. The gear pump 29 is disposed just inside the chamber 37 and when operated by a rotary motion of the shaft 10 draws oil from the passageway 36 and directs it in the manner indicated in Fig. 4 through the discharge side of the pump into the chamber 37. The gear motor 31 is axially aligned with the pump 29 and is arranged within the chamber 38. Oil discharged from the pump 29 flows through the passage 39 to the chamber 38 and is forced into the inlet side of the motor 31. The pressure of the oil acting on the motor gears 33 effects a rotary movement of the gears, and, as indicated in Fig. 5, the oil is thereby carried through the motor to the passageway 36.

Thus, upon operation of the driving shaft 10 the pump 29 generates a flow of oil to the motor 31 which is thereby caused to rotate and drive the shaft 11 and spindle 23. In a nut setting operation, the socket 25 is applied to the work in the manner shown in Fig. 2, and operation of the shaft 10 initiated to effect the circulation of oil through the hydraulic system. As the nut is advanced toward seated position it encounters but slight resistance to rotation and this part of the operation is performed at high speed and the oil pressure at the inlet side of the motor 31 is at a minimum intensity. As the nut reaches seated position, however, its resistance to rotation increases, and such resistance, as reflected in the motor 31, serves to impede the flow of oil through the system. Since the pump 29 functions to deliver a constant volume of oil to the motor a restriction of the free flow of fluid results in a rise in pressure at the motor inlet, which pressure is transmitted to the driven shaft 11 as a rotational impulse of increased power. If, when the nut is seated, the tool is still held applied to the work and the pump 29 is permitted to continue to operate, the oil pressure in the area intermediate the pump and the motor 31 will continue to rise and the nut will be further tightened in seated position. When the nut reaches a degree of tightness corresponding to the greatest pressure capabilities of the pump the resistance imposed upon the motor 31 will equal the oil pressure at the motor inlet and the pump will stall.

In the majority of nut running operations, however, it is desirable to set the nuts to a degree of tightness less than that obtained by a maximum effort of the tool. As a part of the present invention, therefore, there is provided a control means, operating independently of the pump 29, for rendering the hydraulic transmission ineffective. This means takes the form of a fluid by-pass mechanism including a piston type valve 41 movable within a bushing 42 to open and closed positions with respect to a recess or passage 43 (see also Fig. 6) communicating with the passageway 36. The recess 43 is formed in the frame piece 14, in advance of the motor 31, and is connected to the motor inlet passage 39 through a pair of spaced ports 44 and 45 in the bushing 42. The valve 41 is formed with an annular shoulder 46 adapted in the closed position of the valve (Fig. 2) to occupy a position between the ports 44 and 45 and so prevent the flow of oil to the by-pass recess 43. In the open position of the valve (Figs. 1 and 3) the shoulder 46 is moved out of flow preventing position and the passage 39 and by-pass recess 43 are connected through the bushing 42. Thus, in the open position of the by-pass valve 41 the hydraulic transmission is disabled since the oil delivered by the pump 29 to the motor inlet is permitted to make a substantially unrestricted circuit around the motor. If the valve 41 is shifted to open position while a nut is being tightened in seated position, the oil pressure at the motor inlet is immediately reduced to its normal level and the torsional pressure applied to the shaft 11 and spindle 23 is relaxed.

It is further desirable that the by-pass mechanism function automatically in order that a nut setting operation may be terminated when the nut reaches a predetermined degree of tightness, even though the pump 29 continues to circulate oil through the system. In the present tool automatic operation of the valve 41 is effected by fluid pressure and additional control means is provided for controlling the application of fluid to the valve. The additional control means includes a pressure responsive pilot valve 47 movable within a bushing 48 pressed in a longtudinal bore which opens at its upper end into the oil chamber 37. The valve 47 is arranged in the upper end of the bushing 48 and has a head portion 49 normally disposed between the open upper end of the bushing 48 and a passage 51 connecting the interior of bushing 48 to the interior of bushing 42 at a point above the by-pass valve 41. The upper end of the valve 47 is formed with a perforated annular flange which assists in guiding the valve. Communication between the chamber 37 and passage 51 is normally cut off and, when established by movement of the pilot valve downward to the position shown in Fig. 3 permits oil to pass to the upper end of valve 41 and force this valve downward to open position. The valve 47 is actuated by the pressure of the oil on the upper end thereof, and its movement to open position is resisted by a coil spring 52 interposed between the lower end of the valve and a set screw 53 adjustable from outside the frame piece 14. By means of the set screw 53 the force with which the spring 52 urges the valve 47 to closed position may be varied and the exact pressure necessary to operate the valve thereby determined. The pressure of the oil in the chamber 37 is the same as that at the motor inlet so that variations in the load or resistance imposed on the motor 31 are reflected by corresponding changes in the pressure of the oil above valve 47. When the resistance of the motor causes the oil pressure to rise to a height sufficient to overcome the spring 52 valve 47 is forced to open position and oil at high pressure is directed through passage 51 against the upper end of valve 41, thereby opening the by-pass recess 43 to relieve the pressure at the motor inlet.

It will thus be seen that the intensity of the rotational impulse delivered through the motor 31 to the nut is determined by the pressure of spring 52 which is controlled by the set screw 53. Each variation in the pressure with which pilot valve 47 is urged to closed position occasions a corresponding change in the peak pressure obtainable in the hydraulic transmission.

At the time the by-pass valve 41 is shifted to open position the nut has reached the proper determined degree of tightness, and it is unnecessary and undesirable that the tool should operate with a repeated action to deliver additional impulses to the nut. Therefore the by-pass valve is not returned automatically to closed position but must be re-set manually to condition the tool for another nut running operation. According to a feature of the invention the re-setting means for the valve 41 is operated by pressing the tool against the work and is combined with a spring means which holds the valve yieldingly in closed position and is disabled by movement of the valve to open position. The by-pass valve is formed with a stem 41a (Fig. 1) extending forwardly through an oil seal 54 and lying within the frame piece 15 in cooperative relation with a pawl 55 pivotally supported on the outer end of a yoke 56. The separate arms of the yoke 56 embrace the spindle 23 and the inner end of the yoke is loosely mounted on a fixed cross rod 57. The pawl 55 is pressed outward into engagement with the lower end of stem 41a by a coil spring 58 so that if the yoke 56 is rocked upward or rearward about the rod 57 the valve 41 will be carried also upward from the open position of Fig. 1 to the closed position of Fig. 2. Upon actuation of the by-pass valve to open position, the pawl 55 is cammed inwardly by the advancing valve stem 41a and is held in the disabled position of Fig. 3. Downward movement of the yoke 56 serves to restore the parts to the position shown in Fig. 1. Referring particularly to Fig. 7, the yoke 56 is operatively connected to the spindle 23 and is rocked about the pivot rod 57 by relative longitudinal movement between the spindle and the tool body. Each arm of the yoke 56 carries a roller 59 so positioned as to lie between the previously mentioned annular flange 28 on spindle 23 and a second flange 61 formed on the upper end of the spindle. As shown in Fig. 2, a spring pressed plunger 62 is positioned within a recess in the front of shaft 11 and presses against the bottom of spindle recess 30 to maintain the spindle normally in the position shown in Fig. 1, with the flange 28 resting on the internal frame boss. In applying the tool to the work the socket 25 is engaged with the nut to be set, and a relative movement between the spindle and tool body is effected either by moving the work toward the tool or the tool toward the work. In either case such movement is accomplished against the force force of plunger 62 and serves to shift the yoke 56 and by-pass valve 41 to operating position. When the tool is withdrawn from the work, plunger 62 acts to return the spindle 23 to the normal position of Fig. 1, thereby rocking the yoke 56 forwardly to re-set the pawl 55 into engagement with the valve stem 41a.

Immediately following movement of the by-pass valve 41 to open position, the oil pressure in the chamber 37 is reduced sufficiently to permit the pilot valve 47 to be returned upward to closed position. In order that the actuating fluid previously admitted above the valve 41 may not thereby be trapped, an exhaust passage 63 is provided to which the oil may flow around a reduced portion 64 of the pilot valve. As shown in Fig. 3, the valve head 49 cuts off communication between passage 51 and exhaust passage 63 in the open position of the pilot valve. Oil flowing into the exhaust passage may pass through a port 65 and around a reduced portion of the valve 41 to the by-pass recess 43. Additional ports 66 and 67 connect the exhaust passage 63 to respective chambers below the valves 41 and 47 in order that the pressure in these chambers may be kept at a normal level.

What is claimed is:

1. In a nut running or like tool having a work engaging spindle, the combination of a hydraulic power transmission including a pair of independently operable gear pumps, one adapted for positive operation to circulate fluid, and the other being driven by such circulation of fluid, a control element settable to first and second positions to render the power transmission between said pumps effective and ineffective, and means arranged to be operated by pressure of the tool spindle against the work for setting said control element to its said first position.

2. In a nut running or like tool, the combination of a hydraulic power transmission including a pair of independently operable gear pumps, one adapted for positive operation to circulate fluid, and the other being driven by such circulation of fluid, a work engaging rotary spindle driven by the second mentioned of said pair of pumps and having a limited longitudinal movement relatively to the tool, a control element settable to first and second positions to render the power transmission between said pumps effective and ineffective, and means operable by said spindle during relative longitudinal movement thereof for moving said control element to its said first position.

3. In a nut running or like tool, the combination of a hydraulic power transmission including a pair of independently operable gear pumps, one adapted for positive operation to circulate fluid, and the other being driven by such circulation of fluid, a control element settable to first and second positions to render the power transmission between said pumps effective and ineffective, means for moving said control element to its said second position, and a pressure responsive pilot valve within said transmission for controlling the action of said last named means.

4. In a nut running or like tool having a work engaging spindle, the combination of a rotatable driving shaft, a rotatable driven shaft, transmission means including a hydraulic circuit intermediate said driving and driven shafts, a variably settable pressure control element within said hydraulic circuit having two positions of adjustment for opening and closing the circuit, and means operated by pressing the tool spindle against the work for moving said control element from one to another of its control positions.

5. In a nut running or like tool, the combination of a rotatable driving shaft, a rotatable driven shaft, transmission means including a hydraulic circuit intermediate said driving and driven shafts, a work engaging spindle operatively connected to said driven shaft and shiftable longitudinally thereof, a variably settable pressure control element within said hydraulic circuit having two positions of adjustment for opening and closing the circuit, and means operable by said spindle during a longitudinal shifting movement thereof for moving said control element from one to another of its control positions.

6. In a nut running or like tool, the combination of a rotatable driving element, a rotatable driven element, transmission means including a hydraulic circuit intermediate said driving and driven elements, a pump operatively connected to said driving element for circulating fluid through the circuit, and means for limiting the pressure applied through said circuit to said driven element to a single rotational impulse of predetermined intensity, said means including a control element within said circuit and movable from a first to a second control position in response to the attainment of a predetermined pressure therein and movable from second to first control position by manual means.

7. In a nut running or like tool, the combination of a rotatable driving element, a rotatable driven element, transmission means including a hydraulic circuit intermediate said driving and driven elements, a pump operatively connected to said driving element for circulating fluid through the circuit, and means for limiting the pressure applied through said circuit to said driven element to a single rotational impulse of predetermined intensity, said means including a pressure responsive pilot valve within said circuit, and a settable control element movable from a first to a second position by pressure fluid within said circuit under the control of said pilot valve and movable from second to first position by manual means.

8. A hydraulic power transmission comprising a hydraulic circuit, a pump for circulating fluid through said circuit, a rotary motor within said circuit and operated by the circulation of fluid therethrough, said motor being arranged variably to restrict the flow of fluid through the circuit in response to variations in the load imposed thereon, a by-pass for directing fluid around said motor thereby to disable said motor, a valve controlling said by-pass and settable to open and closed positions with respect thereto, and a pressure responsive pilot valve within said hydraulic circuit controlling operation of said by-pass control valve.

9. In a portable nut running or like tool, the combination with rotatable driving and driven elements, of a hydraulic power transmission within the tool and comprising, a fluid operated rotary motor operatively connected to said driven element, a fluid conducting passageway leading to said motor, means comprised in said motor for variably restricting the flow of fluid through said passageway as the load imposed on said motor is varied, a pump operatively connected to said driving element for supplying a constant volume of fluid to said passageway, and an adjustable pressure control means for limiting the pressure obtainable in said passageway to a predetermined peak less than the maximum pressure which the pump is capable of developing.

10. In a portable nut running or like tool, the combination with rotatable driving and driven elements, of a hydraulic power transmission within the tool and comprising, a fluid operated rotary motor operatively connected to said driven element, a fluid conducting passageway leading to said motor, means comprised in said motor for variably restricting the flow of fluid through said passageway as the load imposed on said motor is varied, a pump operatively connected to said driving element for supplying a constant volume of fluid to said passageway, fluid pressure responsive means within said passageway, and means controlled by said fluid pressure responsive means for by-passing the fluid from said passageway around said motor.

11. A nut running or like tool according to claim 10 characterized by means for imparting to said fluid pressure responsive means a variable resistance to actuation.

12. In a nut running or like tool, the combination with rotatable driving and driven elements, of a hydraulic power transmission within the tool and comprising, a fluid reservoir, a fluid operated rotary motor operatively connected to said driven element, a pump operatively connected to said driving element for delivering fluid from said reservoir to said motor to effect operation of said motor, and means independent of said pump for controlling the supply of fluid to said motor to limit the application of pressure through said motor to said driven element to a rotational impulse of an intensity less than the maximum intensity which the pump is capable of developing.

13. In a nut running or like tool, the combination of a hydraulic power transmission means including a fluid operated rotary motor, a fluid conducting passageway leading to said motor, a pump for supplying fluid to said passageway to effect operation of said motor, a by-pass for directing fluid from said passageway around said motor, a valve controlling said by-pass and movable to open and closed positions with respect thereto, means for conducting fluid from said passageway to said valve in a direction to move said valve to open position, and means preventing the passage of fluid to said valve until a predetermined pressure is reached within said passageway.

14. In a nut running or like tool, the combination of a hydraulic power transmission means including a fluid operated rotary motor, a fluid conducting passageway leading to said motor, a pump for supplying fluid to said passageway to effect operation of said motor, a by-pass for directing fluid from said passageway around said motor, a valve controlling said by-pass and movable to open and closed positions with respect thereto, means for moving said valve to open position, and a yielding means for holding said valve in closed position, said yielding means comprising a spring pressed pawl rendered ineffective by movement of said valve to open position.

15. In a nut running or like tool, the combination of a hydraulic power transmission including a fluid operated rotary motor, a pump for supplying fluid to said motor to effect operation of said motor, means independent of said pump for controlling the supply of fluid to said motor including a control element settable to first and second control positions, means for moving said control element from first to second position, a yielding means for holding said element in first position, said yielding means including a spring pressed pawl rendered ineffective by movement of said element to second position, and manually operable means movable to re-set said pawl in effective engagement with said control element and to move said element from second to first position.

16. A hydraulic power transmission comprising a hydraulic circuit, a pump for circulating fluid through said circuit, a rotary motor within said circuit and operated by the circulation of fluid therethrough, a by-pass for directing fluid around said motor thereby to disable said motor, a valve controlling said by-pass and settable to open and closed positions with respect thereto, means for conducting fluid from said circuit to said valve in a direction to move said valve to open position, a pressure responsive pilot valve within said circuit controlling the passage of fluid to said by-pass valve, and means for imparting a variable resistance to actuation to said pilot valve.

17. In a nut running or like tool having a longitudinally shiftable work engaging spindle, the combination of a hydraulic power transmission including a fluid operated rotary motor, a pump for supplying fluid to said motor to effect operation thereof, means independent of said pump for controlling the supply of fluid to said motor including a control element settable to first and second control positions, means for moving said control element from first to second position, a spring pressed pawl holding said element yieldingly in first position and rendered ineffective by movement of said element to second position, and means carrying said pawl and movable by said work engaging spindle in one direction to reset said pawl in effective engagement with said control element and movable by said spindle in the opposite direction to move said element to first position.

LEON F. MEUNIER.